United States Patent [19]

Hedges et al.

[11] Patent Number: 4,960,236

[45] Date of Patent: Oct. 2, 1990

[54] MANUFACTURE OF PRINTED CIRCUIT BOARD ASSEMBLIES

[75] Inventors: Philip S. Hedges, Luton; Wallace Rubin, Northwood, both of Great Britain

[73] Assignee: Multicore Solders Limited, Hemel Hempstead, Great Britain

[21] Appl. No.: 393,590

[22] Filed: Aug. 14, 1989

[51] Int. Cl.$^5$ .......................... B23K 1/02; H05K 3/34
[52] U.S. Cl. ................................. 228/180.1; 228/224; 228/248; 148/24
[58] Field of Search ..................... 228/254, 248, 180.1, 228/180.2, 56.3, 224; 148/24

[56] References Cited

U.S. PATENT DOCUMENTS

| | | | |
|---|---|---|---|
| 3,716,347 | 2/1973 | Bergstrom | 228/248 X |
| 4,504,007 | 3/1985 | Anderson et al. | 228/248 X |
| 4,661,173 | 4/1987 | Barajas et al. | 148/24 |
| 4,701,224 | 10/1987 | Zado | 148/24 X |
| 4,759,490 | 7/1988 | Ochiai | 228/248 X |

Primary Examiner—Kenneth J. Ramsey
Attorney, Agent, or Firm—Harness, Dickey & Pierce

[57] ABSTRACT

To avoid the use of harmful CFCs in the cleaning of soldered printed circuit board assemblies, their manufacture is accomplished using a screen-printable solder paste composition which will in use yield minimal flux residues which will not require removal by a solvent cleaning step. The paste composition is formulated by incorporating the powdered soft solder alloy in a liquid medium containing up to 10% by weight of a non-corrosive organic flux material, a substantially water-immiscible organic solvent, and one or more thickening agents.

20 Claims, No Drawings

MANUFACTURE OF PRINTED CIRCUIT BOARD ASSEMBLIES

This invention relates to the manufacture of printed circuit board (pcb) assemblies, i.e. printed circuit boards having electronic components soldered thereto.

In the manufacture of pcb assemblies by the electronics industry, increasing use has been made of solder creams especially in the automated manufacture of printed circuits in which leadless miniature electronic components are surface mounted on a printed circuit board (pcb) to which a solder cream has previously been applied, generally by screen printing, and the pcb is then subjected to a sufficiently high temperature, for example by means of an infra-red heating device, to cause the flux and solder alloy in the cream to liquefy (generally known as solder reflow) and contact the electronic components so that on subsequent cooling of the pcb, the components will be soldered in situ on the pcb. Such solder creams comprise a homogeneous blend of a soft solder alloy in powder form dispersed in a liquid medium conventionally containing a flux, an organic solvent, and a thickening agent which will impart the desired creamy or pastelike consistency to the mixture. The solder creams can be applied to pcb surfaces or locations requiring soft soldering in a number of various ways, advantageously by screen printing, or by means of a dispenser such as a syringe.

For the manufacture of pcb assemblies in the electronics industry, it has hitherto been desirable to use as the flux component of the solder cream a material which is not only non-corrosive but which will also yield, after the heating and cooling steps, flux residues which are themselves non-corrosive and non-conducting. For this reason, rosin-based flux materials have hitherto been widely used in the commercially available solder creams specifically formulated for use in the manufacture of surface mounted electronic component devices. Alternatively, more reactive fluxes have be used, but these leave residues which are corrosive and conductive. It is therefore necessary to remove these residues by means of either aqueous or organic solvent systems to ensure that the resulting soldered circuit is non-corrosive.

However, even using solder creams containing rosin-based fluxes gives rise to a number of disadvantages from the flux residues which are formed.

In particular, not only can such residues, which remain after soldering, appear to be unsightly, but depending on their composition might be regarded as potentially dangerous for the life of the soldered assembly. In any event such flux residues might prevent the use of automatic test equipment whose probes need to penetrate to the metal surfaces where soldered joints are made and where flux residues leave sticky residues, which foul the test pins and prevent them from conducting the electric current as required for the test.

For these various reasons, it is common for flux residues which remain after soldering to be removed by washing processes which are principally based on solvents, commonly used ones being selected from the class known as chlorofluorohydrocarbons. Other aqueous means of residue removal are also used, but chlorofluorohydrocarbons (CFCs) are particularly convenient because of the volatility of the residual solvent left after the cleaning process.

However, in recent years, because of ecological problems relating to the chemical stability of CFCs which do not decompose through the atmosphere until they reach the upper stratosphere, it has been proven that CFCs have been the cause of a breakdown in the ozone layer, which acts as a filter for ultra-violet rays entering the earth's atmosphere. The catalysed breakdown of the ozone layer which can be created by CFCs is of such dangerous dimension for life on earth, that the Montreal Protocol has been agreed by the major nations who have decided gradually to eliminate the use of CFCs and the electronics industry is consequently committed to phase out the use of CFCs from its production processes.

It is therefore of paramount importance to the electronics industry to be able to utilise a method of producing pcb assemblies which will obviate the necessity of removing flux residues by means of CFCs.

It is an object of the present invention to provide for use in the manufacture of pcb assemblies a solder cream which will be capable not only of being placed in position on a pcb, especially by screen printing, but also, because of its essentially tacky nature, of assisting the electronic components to remain in place prior to infra-red solder reflow as well as possessing sufficient activity at the elevated temperatures commonly employed for solder reflow, whilst at the same time leaving after the reflow process substantially no flux residues so as to leave soldered circuits which will meet, for example, the United States Military Standard MIL-P-28809 cleanliness test and the QQS.571 corrosion test, and exhibit adequate surface insulation resistance (SIR) to prevent current leakage, all without cleaning, and which can be left uncleaned without affecting test probes and without affecting the aesthetics of the well-soldered joints.

Thus by means of the invention, it is possible to completely obviate the need for cleaning with CFC solvents, thereby creating a great advantage for the electronics industry by removing a hazard and reducing the number of production process steps.

In accordance with the invention, in the manufacture of pcb assemblies by a process including the steps of applying a solder cream to a pcb in required locations thereon, mounting thereon the desired electronic components, and thereafter subjecting the resulting pcb assembly to an elevated temperature sufficient to cause solder reflow, the improvement which comprises utilising as the solder cream a screen-printable paste composition comprising from 80 to 95% by weight of a finely divided soft solder alloy having a particle size of up to 100 $\mu$m substantially uniformly dispersed in a liquid medium containing not more than 10% by weight of a non-corrosive organic flux material selected from organic carboxylic acids, amines and amine hydrohalide salts, a substantially water-immiscible organic solvent and one or more thickening agents, and thereby obviating the necessity of subjecting the soldered pcb assembly to a cleaning step after the solder reflow step.

The solder cream will advantageously contain from 85 to 95% by weight of the solder alloy and from 5 to 15% by weight of the liquid medium, which itself will advantageously contain from 0.2 to 10% by weight of the flux material and from 0.1 to 10% by weight of the thickening agent(s).

In a preferred embodiment of the invention, the solder cream will also comprise a volatile amine capable of reacting with any excess acid remaining from the soldering operation and/or a chelating agent capable of reducing any discoloration created by metal reaction products.

Solder creams used in accordance with the invention give minimal (i.e. not visibly discernable) flux residues and the necessity of any cleaning operations can therefore be obviated. In particular, solder creams which can be formulated in accordance with the invention are capable in use of meeting the stringent requirements of the MIL-P-28809 cleanliness test and Bellcore SIR test without the necessity of washing or cleaning the soldered electronic circuits. However, if cleaning is a requirement, it will be comparatively easy to effect.

The organic carboxylic acids useful as flux materials in formulating the solder cream include aliphatic carboxylic acids, for example, propionic acid, oxalic acid, adipic acid, malic acid, maleic acid and citric acid, and aromatic carboxylic acids, for example salicylic avid, abietic acid (rosin) or derivatives thereof.

Advantageously two or more aliphatic carboxylic acids, preferably dicarboxylic acids, are present in the solder cream as the flux material, for example malic acid and adipic acid.

Amines and amine hydrohalide salts which may be used as flux material include alkyl and cycloalkyl amines and aromatic amines, and the hydrohalide salts of such amines, for example diethylamine, triethylamine, cyclohexylamine, and their corresponding hydrohalides, such as triethylamine hydrobromide.

Substantially water-immiscible organic solvents which can be used include monohydric compounds, for example terpineol, esters, for example, 2- ethoxyethyl acetate, and ethers, for example, dipropylene glycol dibutyl ether. Such solvents will have boiling points below the reflow temperature of the solder used and will have low moisture absorption. These solvents may be blended with polyhydric compounds such as glycols, for example diethylene glycol, dipropylene glycol or hexylene glycol, or hydric ethers, for example triethylene glycol monoethyl ether or tetraethylene glycol dimethyl ether, provided that the blend is substantially water-immiscible and has an appropriate boiling range.

The thickening agent may be any of those conventionally employed in preparing solder creams, such as, for example, ethyl cellulose or hydrogenated castor oil. It has been found that advantageously two or more thickening agents should be present in the solder cream, for example ethyl cellulose and hydrogenated castor oil.

The volatile amine which is preferably present in the liquid medium may be, for example, morpholine or tributylamine, whilst the chelating agent which may also preferably be present may be, for example, benzotriazole or imidazole.

The solder cream may also contain a biocide to help avoid fungal attack on the soldered pcb assembly, for example 2-bromo-2-nitropropane-1,3. The biocide may be present in an amount up to 0.25% by weight.

In the preferred embodiment of the invention, the liquid medium employed in formulating the solder cream used in the invention can contain the organic flux in an amount of from 0.2 to 10% by weight of the liquid medium, preferably from 0.5 to 5% by weight, the thickening agent in an amount of from 0.1 to 10% by weight, preferably from 0.5 to 5% by weight, the volatile amine in an amount of from 0 to 10% by weight, preferably from 0 to 3% by weight, and the chelating agent in an amount of from 0 to 1% by weight, preferably from 0 to 0.5% by weight of the liquid medium.

The powdered soft solder alloy used in formulating the solder cream may consist of particles of, for example, tin/lead alloy, tin/lead/antimony alloy, or tin/lead/silver/antimony alloy. Such alloys may consist by weight of, for example, 60% tin/40% lead, 63% tin/36.7% lead/0.3% antimony, or 62% tin/35.7% lead/2% silver/0.3% antimony. The solder alloy powder will normally have a particle size not larger than 100 microns ($\mu$m), generally in the range from 20 to 75 microns.

The preparation of the powdered soft solder alloy is generally effected in a substantially inert gaseous atmosphere, for example nitrogen gas, in order substantially to eliminate oxidation of the alloy particles and thereby produce a solder cream substantially free of oxides (less than 0.1% by weight) the presence of which would deleteriously affect the efficiency of the other constituents of the paste and increase the likelihood of satellite solder balls to be formed.

The solder cream may be prepared by admixing, in a manner conventionally known per se, the powdered soft solder alloy with the liquid medium.

When using the solder cream in accordance with the invention, it has been found advantageous to effect the solder reflow step in a substantially inert gaseous atmosphere, for example gaseous nitrogen.

The following Examples illustrate the invention.

EXAMPLE 1

An alloy of tin/lead/antimony in weight percentages of 63% Sn/36.7% Pb/0.3% Sb was formed into a substantially oxide-free finely divided powder having a particle size between 53 and 75 microns.

This powdered alloy was mixed with a liquid medium containing:

|  | % by weight |
| --- | --- |
| Malic acid | 0.84 |
| Adipic acid | 3.52 |
| Benzotriazole | 0.15 |
| Polymerised rosin | 5.0 |
| Triethylene glycol monoethyl ether | 41.37 |
| Morpholine | 2.75 |
| Ethyl cellulose | 4.0 |
| Hydrogenated castor oil | 1.0 |
| Terpineol | 41.37 |
|  | 100.00 | in proportions such as to yield a solder cream containing 90% by weight of the soft solder alloy and 10% by weight of the liquid medium, and having a viscosity of 500,000± 10% centipoises at 20° C.

The solder cream produced in the foregoing manner was used to secure leadless surface mounted electronic components to a pcb. The solder cream was applied to the pcb by screen printing to a thickness of about 250 microns and thereafter the electronic components, such as resistors and capacitors, were positioned in the required locations on the solder cream-coated circuit. The components were held in place during production operations by the residual tackiness of the applied solder cream. The pcb was then heated to a temperature of 215° C., which was about 32° C. above the liquidus of the soft solder alloy, by passing it through an infrared heating zone under a gaseous nitrogen atmosphere, which caused the alloy particles and flux in the solder cream to melt and thereby solder the electronic components to the circuit, after which it was rapidly cooled to below the solidus of the solder alloy so as to permanently retain the components in position on the pcb.

It was noted that the amount of flux residues on the resulting soldered pcb assembly was negligible and the pcb assembly passed the MIL-P-28809 cleanliness test and the Bellcore SIR test without being washed or cleaned.

EXAMPLE 2

The procedure of Example 1 was followed but with a liquid medium composed as follows:

|  | % by weight |
| --- | --- |
| Maleic acid | 3.0 |
| Hydrogenated castor oil | 4.0 |
| Terpineol | 50.0 |
| Dipropylene glycol | balance |

When used to solder electronic components to a pcb in the manner described in Example 1, substantially similar results were obtained.

EXAMPLE 3

The procedure of Example 1 was followed but with a liquid medium composed as follows:

|  | % by weight |
| --- | --- |
| Malic acid | 1 |
| Adipic acid | 2 |
| Morpholine | 1.2 |
| Benzotriazole | 0.2 |
| Ethyl cellulose | 3.0 |
| Hydrogenated castor oil | 1.0 |
| Terpineol | 50.0 |
| Triethylene glycol monoethyl ether | balance |

When used to solder electronic components to a pcb in the manner described in Example 1, similar results were obtained.

EXAMPLE 4

The procedure of Example 1 was followed but with a liquid medium composed as follows:

|  | % by weight |
| --- | --- |
| Cyclohexylamine | 3.0 |
| Benzotriazole | 0.2 |
| Ethyl cellulose | 4.0 |
| Hydrogenated castor oil | 1.0 |
| Triethylene glycol monoethyl ether | 50.0 |
| Terpineol | balance |

EXAMPLE 5

The procedure of Example 1 was followed but with a liquid medium composed as follows:

|  | % by weight |
| --- | --- |
| Triethylamine hydrobromide | 1.5 |
| Ethyl cellulose | 3.0 |
| Hydrogenated castor oil | 2.0 |
| Dipropylene glycol | 50.0 |
| Terpineol | balance |

EXAMPLE 6

The procedure of Example 1 was followed but with a liquid medium composed as follows:

|  | % by weight |
| --- | --- |
| Oxalic acid | 2.0 |
| Hydrogenated castor oil | 4.0 |
| Morpholine | 1.2 |
| Benzotriazole | 0.2 |
| Terpineol | balance |

We claim:

1. In the manufacture of printed circuit board assemblies by a process including the steps of applying a solder cream to a printed circuit board in required locations thereon, mounting on the board the desired electronic components, and thereafter to subjecting the resulting printed circuit board assembly to an elevated temperature sufficient to cause solder reflow, the improvement which comprises utilising as the solder cream a screen-printable paste composition comprising from 80 to 95% by weight of a finely divided soft solder alloy having a particle size of up to 100 $\mu$m substantially uniformly dispersed in a liquid medium containing not more than 10% by weight of a non-corrosive organic flux material selected from organic carboxylic acids, amines and amine hydrohalide salts, a substantially water-immiscible organic solvent and one or more thickening agents, and thereby obviating the necessity of subjecting the soldered pcb assembly to a cleaning step after the solder reflow step.

2. The improvement as claimed in claim 1, wherein the liquid medium contains from 0.2 to 10% by weight of the flux material, and from 0.1 to 10% by weight of the thickening agent(s).

3. The improvement as claimed in claim 2, wherein the paste composition further comprises (1) a volatile amine capable of reacting with any excess acid remaining from the soldering operation and/or (2) a chelating agent capable of reducing any discoloration created by metal reaction products.

4. The improvement as claimed in claim 3, wherein the paste composition contains morpholine as the volatile amine and benzotriazole as the chelating agent.

5. The improvement as claimed in claim 1, wherein the flux material comprises an aliphatic carboxylic acid.

6. The improvement as claimed in claim 5, wherein two or more aliphatic dicarboxylic acids comprise the flux material.

7. The improvement as claimed in claim 1, wherein two or more thickening agents are present in the paste composition.

8. The improvement as claimed in claim 7, wherein ethyl cellulose and hydrogenated castor oil are both present as thickening agents.

9. The improvement as claimed in claim 1, wherein the substantially water-immiscible organic solvent is a monohydric compound optionally blended with a polyhydric compound.

10. The improvement as claimed in claim 9, wherein the monohydric compound is terpineol and the optional polyhydric compound is dipropylene glycol or triethylene glycol monoethyl ether.

11. A solder cream formulated for use in the soldering of electronic components to printed circuit boards whereby substantially no flux residues are formed after the solder reflow step, the solder cream being a screen-printable paste composition comprising from 80 to 95% by weight of a finely divided soft solder alloy having a particle size of up to 100 μm substantially uniformly dispersed in a liquid medium containing not more than 10% by weight of a non-corrosive flux material selected from organic carboxylic acids, amines and amine hydrohalide salts, a substantially water-immiscible organic solvent and one or more thickening agents.

12. A paste composition as claimed in claim 11, wherein the liquid medium contains from 0.2 to 10% by weight of the flux material, and from 0.1 to 10% by weight of the thickening agent(s).

13. A paste composition as claimed in claim 12, wherein the paste composition further comprises (1) a volatile amine capable of reacting with any excess acid remaining from the soldering operation and/or (2) a chelating agent capable of reducing any discoloration created by metal reaction products.

14. A paste composition as claimed in claim 13, wherein the paste composition contains morpholine as the volatile amine and benzotriazole as the chelating agent.

15. A paste composition as claimed in claim 11, wherein the flux material comprises an aliphatic carboxylic acid.

16. A paste composition as claimed in claim 15, wherein two or more aliphatic dicarboxylic acids comprise the flux material.

17. A paste composition as claimed in claim 11, wherein two or more thickening agents are present in the paste composition.

18. A paste composition as claimed in claim 17, wherein ethyl cellulose and hydrogenated castor oil are both present as thickening agents.

19. A paste composition as claimed in claim 11, wherein the substantially water-immiscible organic solvent is a monohydric compound optionally blended with a polyhydric compound.

20. A paste composition as claimed in claim 19, wherein the monohydric compound is terpineol and the optional polyhydric compound is dipropylene glycol or triethylene glycol monoethyl ether.

* * * * *